(12) United States Patent
Cochran

(10) Patent No.: US 7,431,059 B2
(45) Date of Patent: Oct. 7, 2008

(54) TREE AND TREE STUMP CUTTING APPARATUS

(75) Inventor: William A. Cochran, Colwich, KS (US)

(73) Assignee: Coneqtec Corp., Witchita, KS (US)

( * ) Notice: Subject to any disclaimer, the term of this patent is extended or adjusted under 35 U.S.C. 154(b) by 0 days.

(21) Appl. No.: 11/332,918

(22) Filed: Jan. 17, 2006

(65) Prior Publication Data

US 2006/0157153 A1   Jul. 20, 2006

Related U.S. Application Data

(60) Provisional application No. 60/643,950, filed on Jan. 14, 2005.

(51) Int. Cl.
*A01G 23/06* (2006.01)

(52) U.S. Cl. ................... 144/24.12; 144/4.1; 144/34.1

(58) Field of Classification Search ................ 144/4.1, 144/34.1, 34.5, 24.12
See application file for complete search history.

(56) References Cited

U.S. PATENT DOCUMENTS

| | | | | |
|---|---|---|---|---|
| 3,336,958 | A | * | 8/1967 | Carlton ................. 144/24.12 |
| 3,818,957 | A | | 6/1974 | Schoonover |
| 4,219,058 | A | * | 8/1980 | Albright ................. 144/4.1 |
| 4,445,557 | A | | 5/1984 | Peters, III |
| 4,709,736 | A | | 12/1987 | Bellars |
| 5,186,225 | A | | 2/1993 | Kenyeres |
| 5,329,752 | A | * | 7/1994 | Milbourn ............... 56/16.4 R |
| 5,445,197 | A | * | 8/1995 | Larsson ................. 144/34.1 |
| 5,499,771 | A | | 3/1996 | Esposito et al. |
| 5,641,129 | A | | 6/1997 | Esposito et al. |
| 5,655,581 | A | * | 8/1997 | Craft ..................... 144/24.12 |
| 5,718,271 | A | | 2/1998 | Engelhoven |
| 5,738,155 | A | | 4/1998 | Cochran |
| 5,743,315 | A | | 4/1998 | Esposito et al. |
| 5,829,497 | A | * | 11/1998 | Maroney ............... 144/24.12 |
| 5,975,166 | A | * | 11/1999 | MacLennan ............. 144/4.1 |
| 6,085,505 | A | * | 7/2000 | Edwards ................ 56/15.2 |
| 6,431,231 | B1 | * | 8/2002 | Braaten et al. ........ 144/24.12 |
| 6,435,234 | B1 | | 8/2002 | Paumier |
| 6,513,841 | B1 | * | 2/2003 | Jackson .................. 292/214 |
| 6,662,835 | B1 | | 12/2003 | Gengler |

* cited by examiner

*Primary Examiner*—Shelley Self
(74) *Attorney, Agent, or Firm*—Woodard, Emhardt, Moriarty, McNett & Henry LLP

(57) ABSTRACT

One preferred embodiment of the present invention includes a cutting system with an hydraulically powered cutting member such as a cutting wheel or blade. The cutting member is arrangeable in a first configuration for substantially vertical cutting, and the cutting member is arrangeable in a second configuration for substantially horizontal cutting. One option includes a rotating joint allowing the cutting member to be arranged between the first configuration and the second configuration. In certain preferred embodiments, the cutting system is on a frame mountable in combination with a support vehicle, such as a skid steer loader.

16 Claims, 4 Drawing Sheets

TREE AND TREE STUMP CUTTING APPARATUS

REFERENCE TO RELATED APPLICATION

The present application claims the benefit of U.S. Provisional Patent Application Ser. No. 60/643,950 filed Jan. 14, 2005 entitled "Tree and Tree Stump Cutting Apparatus" which is hereby incorporated by reference in its entirety.

FIELD OF THE INVENTION

This invention relates to the field of cutting systems, such as devices for cutting trees and tree stumps, typically powered by an hydraulic power system.

BACKGROUND OF THE INVENTION

Various implements are used for cutting trees or grinding away tree stumps. Often such implements are hydraulically powered, and may be mounted on a support vehicle, such as a skid steer loader. Typically one style of implement must be used for horizontal cutting, such as to cut or trim trees, branches, shrubs and undergrowth and a different style of implement must be use for vertically cutting, such as to grind away trees stumps above and below ground level. The need for two different implements requires an additional cost of equipment for purchase and maintenance, and typically requires time and effort for the operator to switch between implements.

In normal use, a skid steer loader has a loader bucket pivotally attached to and spanning between two front lift arms, the loader bucket is used to move and disburse dirt, rocks and debris. In certain options, the loader bucket of a skid steer loader may be removed and alternate or auxiliary implements such an auger, a jack hammer, or a stump cutter may be attached in its place. Such auxiliary implements commonly are powered by the skid steer loader's hydraulic power system.

Auxiliary implements attachable to the lift arms of a skid steer loader are commonly mounted and positioned at a centrally located point between the forward ends of the lift arms. However, traditional central mounting of tree stump cutting auxiliary implements between the lift arms of a skid steer loader has several functional disadvantages. One disadvantage is that due to the downward view and intervening equipment such as a debris shield, an equipment operator seated at the operator's seat of the skid steer loader has no direct line of sight for viewing the stump cutting implement as it impinges upon a stump. The lack of a direct line of sight sometimes makes it difficult for the equipment operator to accurately control the stump cutting wheel. Another disadvantage is that rocks and wood chips are often forcefully thrown to the rear directly toward the equipment operator.

Certain embodiments of the present invention address these issues.

SUMMARY OF THE INVENTION

One preferred embodiment of the present invention includes a cutting system with an hydraulically powered cutting member such as a cutting wheel or blade. The cutting member is arrangeable in a first configuration for substantially vertical cutting, and the cutting member is arrangeable in a second configuration for substantially horizontal cutting. One option includes a rotating joint allowing the cutting member to be arranged between the first configuration and the second configuration. In certain preferred embodiments, the cutting system is on a frame mountable in combination with a support vehicle, such as a skid steer loader.

It is an object of certain embodiments of the present invention to provide an improved cutting system.

Other and further objects and benefits of embodiments of the present invention shall become apparent upon review of the detailed description which follows, and upon review of the appended drawings.

DETAILED DESCRIPTION OF PREFERRED EMBODIMENTS

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

One preferred embodiment of the present invention includes a cutting system with an hydraulically powered cutting member such as a cutting wheel or blade. The cutting member is arrangeable in a first configuration for substantially vertical cutting, and the cutting member is arrangeable in a second configuration for substantially horizontal cutting. One option includes a rotating joint allowing the cutting member to be arranged between the first configuration and the second configuration. In certain preferred embodiments, the cutting system is mountable in combination with a support vehicle, such as a skid steer loader.

Figure 1:
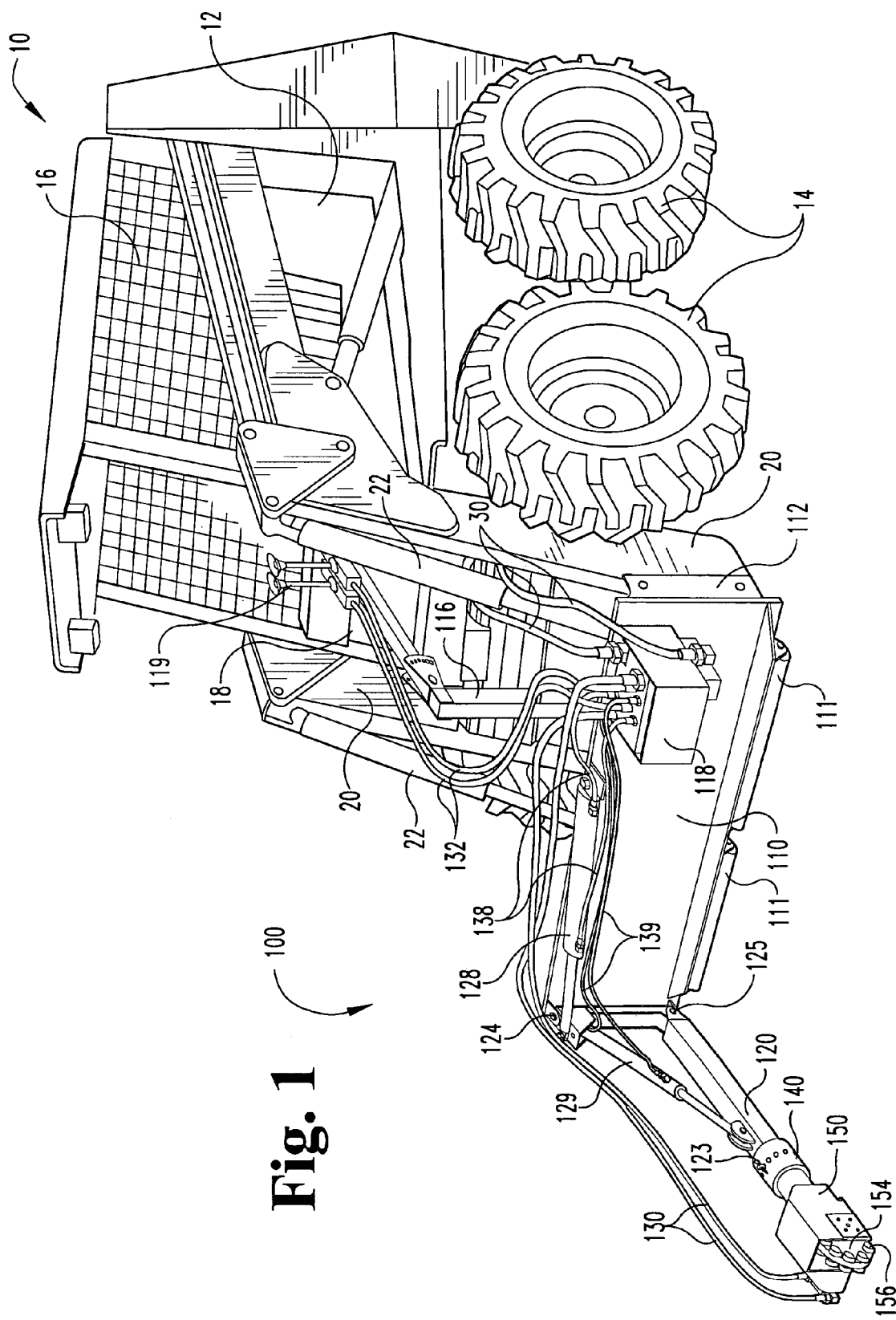
FIG. 1 is a perspective view of a cutting apparatus and skid-steer loader according to a preferred embodiment of the present invention.

Illustrated in FIG. 1 is a combination of a cutting system and skid steer loader. A typical skid steer loader 10 is a type of support vehicle having a frame 12, four wheels 14, an operator position, such as a cage or cab 16 with a seat 18, and a pair of left and right front lift arms 20. Left and right hydraulic cylinders 22 may be paired with the lift arms 20. Preferably, various work implements may be coupled and uncoupled from the lift arms 20.

The skid-steer loader 10 may have an hydraulic power system, which may be selectively coupled directly or through an interface to certain work implements to provide hydraulic power to the implements. Generally the skid steer loader and any work implements are controlled by an operator located in the operator position. In some skid steer loaders, the operator enters the operator position from the front of the vehicle.

Figure 2:
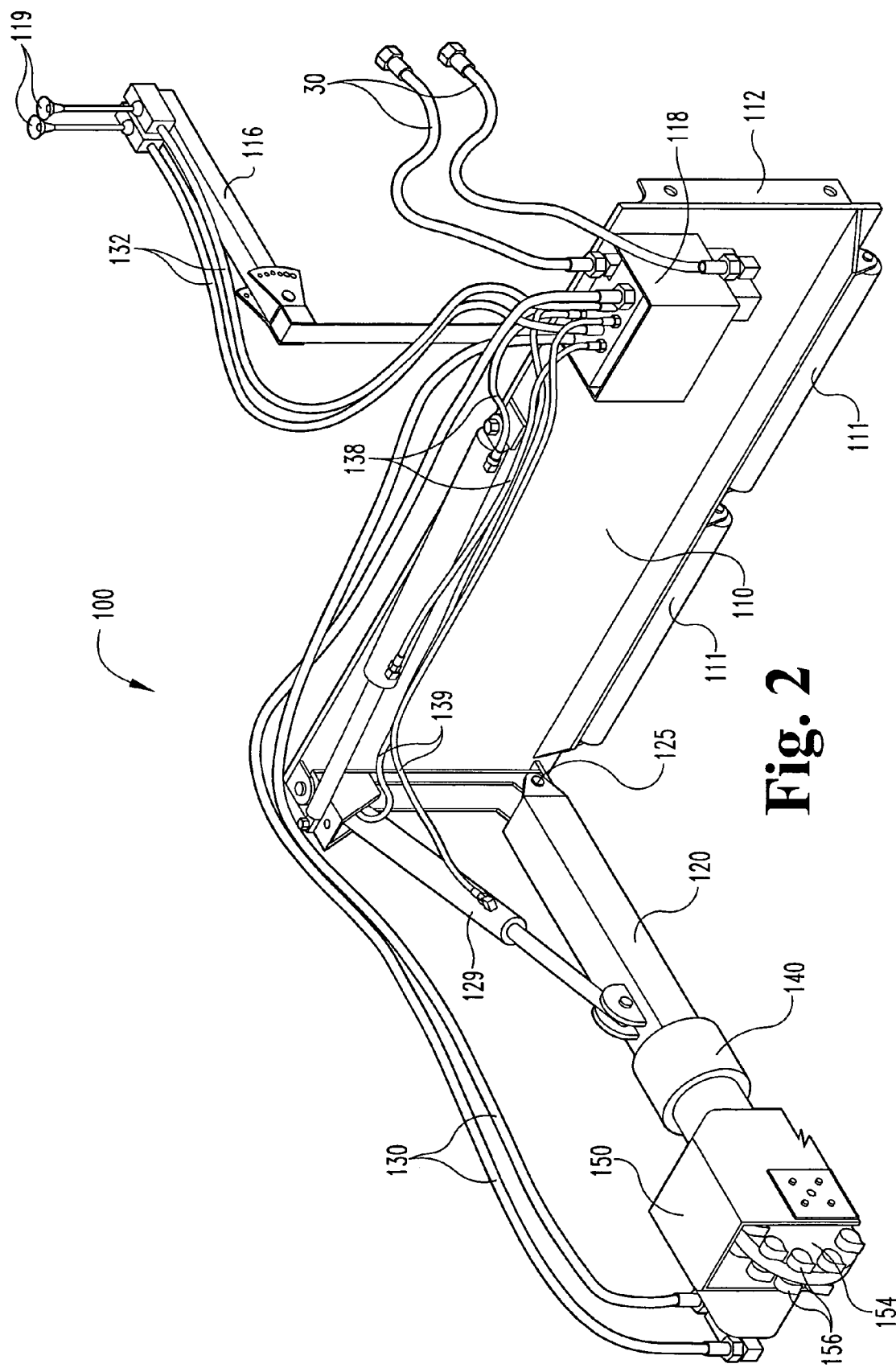
FIG. 2 is a perspective view of a cutting apparatus according to a preferred embodiment of the present invention.
Figure 3:
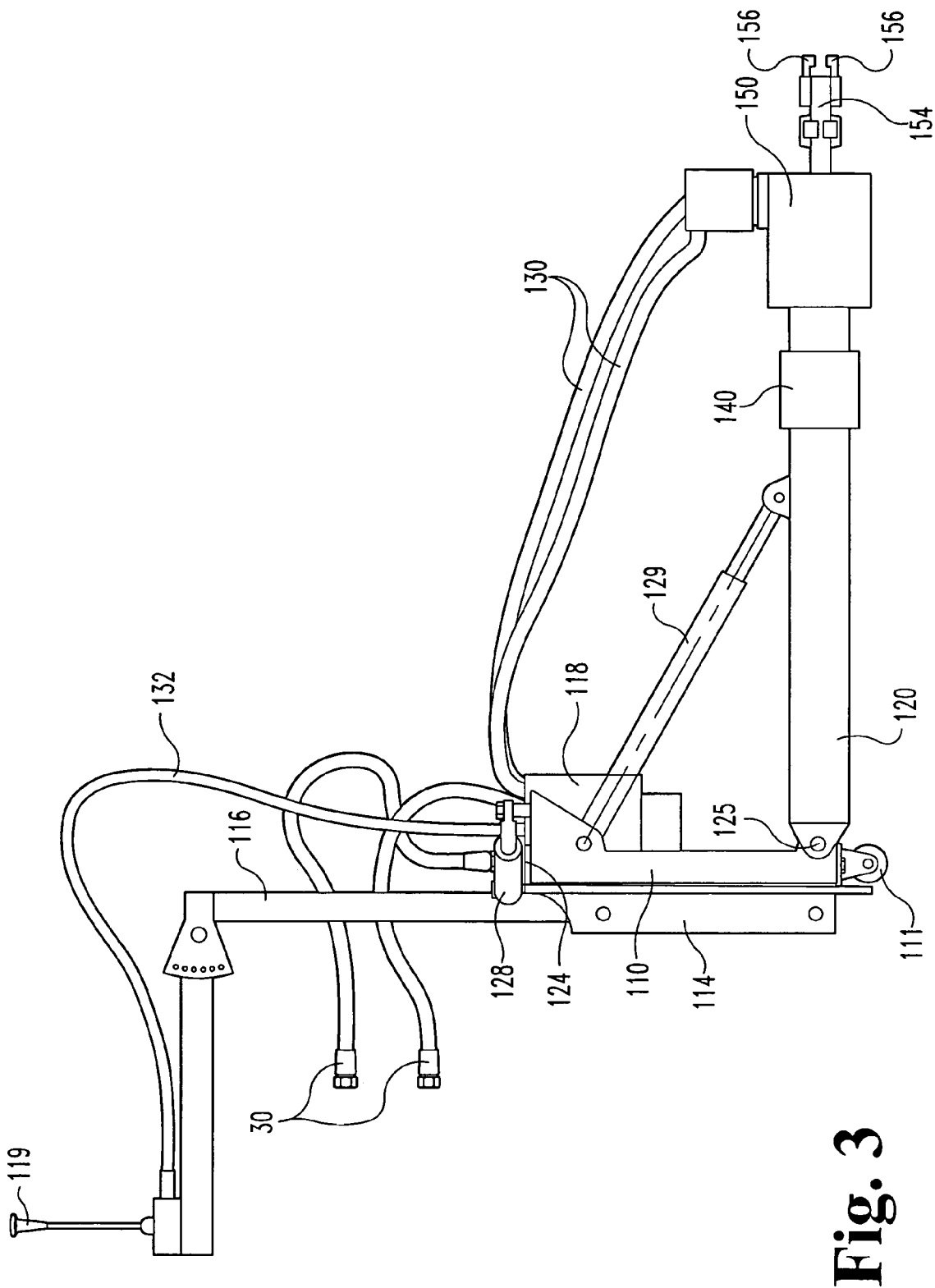
FIG. 3 is a side view of the cutting apparatus of FIG. 2.

FIG. 1 illustrates cutting system 100 in combination with skid steer loader 10. Views of cutting system 100 are illustrated in FIGS. 1-3. Cutting apparatus includes a frame 110, generally configured to be mounted to the left and right arms 20 of the skid steer loader and optionally the left and right hydraulic cylinders 22. In a preferred embodiment, brackets 112 and 114 are provided at the rear of the frame allowing the cutting apparatus to be attached to the lift arms 20 and/or cylinders 22. Left and right arms 20 and the left and right hydraulic cylinders 22 may function in concert to pivot the orientation of frame 110 and the overall cutting system 100. A skid steer loader and stump grinding implement are taught in U.S. Pat. No. 4,812,103, incorporated herein by reference.

An extension arm 120 has a proximal end attached to frame 110 and extends to a distal end which incorporates a cutting assembly 150. In certain preferred embodiments, the extension arm incorporates a pivot joint 140 configured to allow the cutting assembly 150 to be switched between a vertical cutting configuration or a horizontal cutting configuration, and optionally in various cutting angles in a range between horizontal and vertical.

An hydraulic interface 118 associated with the cutting system is connectable to control cylinders on the support vehicle using hydraulic supply and return lines 30. Typically the hydraulic transmission interface 118 is mounted on the cutting system frame 110. Hydraulic lines typically are provided in pairs of a high-pressure power line and a low-pressure return line. Hydraulic power and return lines 130 extend within the cutting system from the hydraulic interface 118 to the cutting assembly 150 and optionally to various adjustment mechanisms. Hydraulic or mechanical control lines 132 extend from hydraulic interface 118 to an operator control position, such as control levers 119 on a control arm such as a stalk 116 extending from frame 110 to adjacent an operator location.

In a preferred embodiment, frame 110 is configured as a lateral piece, which may function as a debris shield. Optionally rollers 111 are mounted adjacent the foot of the frame to allow the frame to rest upon and roll over a support surface. In certain preferred embodiments, the lateral piece has one end attached to one arm of the skid steer loader, for example with end bracket 112, and has an opposing end extending laterally beyond the opposing side of the skid-steer loader. In this arrangement, the second arm of the skid-steer loader is mounted to a mid-frame bracket 114 (FIG. 3).

In certain preferred embodiments, the extension arm 120 and correspondingly cutting assembly 150 are mounted laterally offset from the centerline of the skid-steer loader, for example at the extreme right or left end of the frame 110. In a laterally offset arrangement, a rearward debris path from the cutting assembly is not aligned with the operator or seat 18, and preferably allows more precise control by allowing an offset line-of-sight for the operator to view the operation and location of the cutting assembly.

In certain preferred embodiments, extension arm 120 is pivotally mounted to be horizontally and vertically adjustable to control the precise location of the cutting assembly 150 relative to frame 110 and skid-steer loader 10. In one example, a horizontal pivot bracket and joint 124 provides pivotal motion in the horizontal plane by means of a spaced clevis joint pivotally affixed at its upper and lower ends by support pins. An optional horizontal adjustment cylinder 128 extends between frame 110 and a spaced along extension arm 120 defining a lever arm to selectively control the horizontal pivotal movement of arm 120. As shown, the pivot connection is on an extension flange of the pivot bracket. Power to horizontal adjustment cylinder 128 may be controlled by a pair of hydraulic supply and return lines 138.

In the same example, a vertical pivot bracket and joint 125 provides pivotal motion in the vertical plane by means of a spaced clevis joint pivotally affixed at its ends by support pins. As shown, the clevis joint is mounted on the horizontal pivot bracket. A vertical adjustment cylinder 129 extends between a point on frame 110, such as the upper end of the horizontal pivot bracket, and a midpoint spaced along extension arm 120 defining a lever arm to selectively control the vertical pivotal movement of arm 120. Power to vertical adjustment cylinder 129 may be controlled by a pair of hydraulic supply and return lines 139.

The cutting assembly 150 preferably has a rotating cutting wheel. In one option, cutting wheel is a blade with cutting teeth defined on the periphery of the blade. In an alternate embodiment, cutting wheel 154 has a plurality of cutting teeth 156 mounted adjacent the periphery of the wheel on one and preferably both sides of wheel 154. Preferably the cutting wheel and teeth are suitable for cutting wood, such as brush and trees and are suitably formed to grind stumps adjacent or below ground level. Alternately they may be configured for other materials. As viewed in FIG. 2, the cutting wheel is rotatably driven counter-clockwise by an hydraulic motor. As preferred options, the cutting assembly can incorporate a protective shroud and a ricochet guard to minimize flying rocks and wood chips. In certain preferred embodiments, the hydraulic cutting power and return lines 130 are arranged at a connection point above wheel 154 and held away from the cutting wheel to prevent damage.

Figure 4:
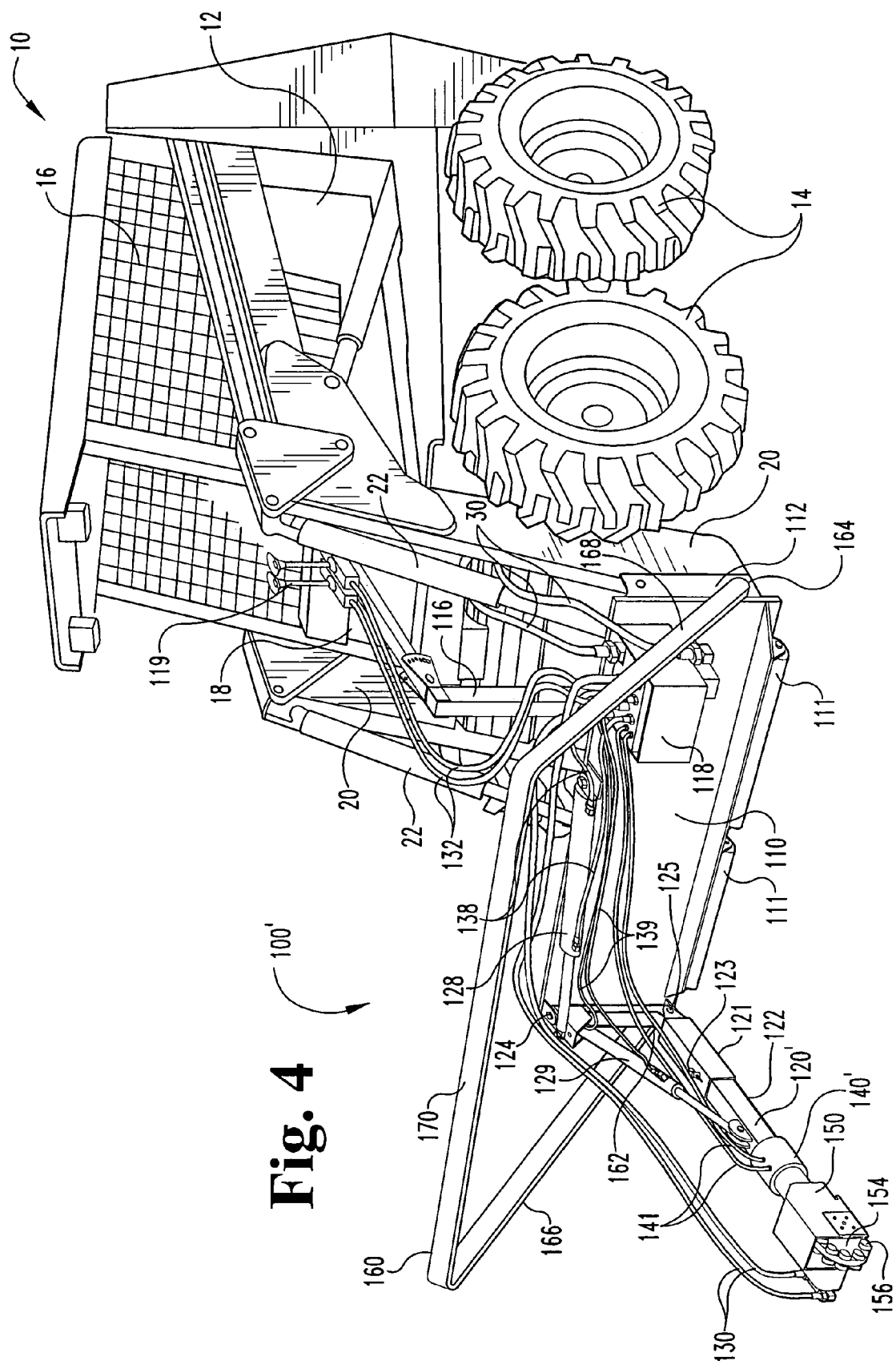
FIG. 4 is a perspective view of a cutting apparatus and skid-steer loader according to a another preferred embodiment of the present invention.

FIG. 4 illustrates a cutting system 100' according to another embodiment of the present invention, where like reference numerals refer to like features previously described. Cutting system 100' includes arm 120' configured to be extendable and retractable relative to frame 110, to allow cutting assembly 150 to advance without moving and repositioning skid steer loader 10. For example, arm 120' can be arranged with telescopic extension members 121 and 122, and the extension or retraction of arm 120' can be hydraulically actuated. In other words, the telescoping movement may be hydraulically controlled. Additionally, arm 120' can be locked in an extended position by a cotter pin 123 inserted in holes in the extension members 121 and 122.

Cutting system 100' illustrated in FIG. 4 can also include a protective shield or bumper, such as bar 160. Bar 160 extends outward from frame 110 over the working area of cutting assembly 150 and preferably is configured to contact a tree, limb or other taller debris during the cutting process and exert a force in a direction away from frame 110, encouraging the cut object to fall away from the skid steer loader operator. In certain options, bar 160 is hydraulically powered to extend or pivot to allow repositioning of the bar to better contact the tree, or other such item, being cut. In other embodiments, bar 160 is fixed in a stationary position relative to the cutting system 100.

In the illustrated embodiment, bar 160 is connected to frame 110 of cutting assembly 150 at connection points 162 and 164 proximal the side ends of the frame. It should be appreciated that bar 160 can be connected to cutting system 100 in appropriate manners as would occur to one skilled in the art, including, as an example, via pivot brackets.

In the illustrated embodiment, bar 160 includes two side portions 166 and 168 extending upward and outward from connection points 162 and 164, and a horizontal portion 170 extending between distal ends of extension portions 166 and 168. The bar can be configured differently as would occur to one skilled in the art. As an example, the bar can include a single side portion with a front or end configured to contact and exert a force on the item being cut. The bar 160 can be a single continuous member or separate section members connected together.

Referring to FIG. 1, control valves for the cutting wheel and for the vertical and horizontal adjustment cylinders are remotely actuatable by means of control lines 132. In one option the cores are slidable and capable of being alternately driven or pulled through manual manipulation of control levers 119 which respectively function to actuate cable pulling and pushing mechanisms. The control levers 119 are supported by a stalk or support arm 116 which in certain options is adjustable to be adjacent an operator position by means of a swivel joint and an adjustment pin.

In use a skid steer loader 10 having the system 100 as portrayed attached to its lift arms and to its left and right hydraulic cylinders is driven with the lift arms slightly raised into close proximity with a tree to be cut and/or stump to be removed. The left and right lift arms 20 of the skid steer loader 10 are then lowered until rollers 111 rotatably attached to the lower edge of the frame 110 contact the ground.

For cutting shrubbery or a tree, the cutting assembly 150 is rotated to a horizontal cutting configuration, with cutting wheel 154 extending in the intended direction of cutting. The cutting assembly is then oriented horizontally and vertically to a desired starting location, preferably leaving clearance room for the cutting assembly to advance as the cutting action progresses.

Hydraulic power is then supplied to the cutting assembly 150 to rotate cutting wheel 154 to a suitable cutting speed. The cutting assembly is then advanced to and through the target cutting location by horizontal and/or pivotal movement using the horizontal and vertical control cylinders 128 and 129, or by re-positioning of the skid-steer loader 10 and frame 110 if necessary.

For stump cutting, the skid steer loader is positioned horizontally and vertically so that the cutting assembly 150 overlies the edge of the tree stump, preferably leaving clearance room for the cutting assembly to advance as the cutting action progresses. The arm and cutting assembly 150 position is then manipulated to cause the cutting wheel 154 to selectively and universally move upwards, downwards, rightwards, or leftwards through the combined action of the arm control cylinders 128 and 129. If necessary, forward and rearward motion of the cutting wheel over the tree stump is achieved by selectively driving the skid steer loader forward or rearward, causing the stump cutting apparatus to roll forward or rearward upon its lower rollers 111.

Rotation joint 140 allows cutting assembly 150 to be rotated between a horizontal cutting orientation and a vertical cutting orientation. In one option, extension arm 120 incorporates two pipe portions with the end of one portion received within an end portion of the other pipe to form joint 140. Rotation joint 140 may be manually operated for rotation (FIG. 1) or may incorporate a powered rotation mechanism. In certain preferred embodiments for example FIG. 4, rotation joint 140' is hydraulically powered to rotate the cutting assembly. In such embodiments, hydraulic power lines 141 can extend internally or externally from hydraulic interface 118 to rotation joint 140'.

As one option, the pipe portion ends may be swaged to form a close fit allowing rotation, yet preventing over-extension or over-retraction of the pipe portions. Collars or flanges may be used to retain the joint assembly together. In another option, a proximal square cross-sectioned arm portion includes a round collar on its distal end which receives the proximal end of a round pipe portion, and is held together with a collar or flange. In an alternate option, circular cross-section pipe portions form a threaded connection which inhibits extension or retraction.

Rotation joint 140 incorporates sufficient strength to withstand vertical and horizontal counter-pressures experienced during cutting operations. Rotation joint 140 allows the cutting assembly to be rotated without removal of one implement and mounting of a different implement. In certain embodiments, the rotation joint incorporates a locking mechanism, such as a cotter pin 123 through holes in interlocking arm portions, to maintain cutting assembly 150 at a desired angle. In one option, rotation joint 140 may have multiple rotation locations in which the cutting assembly can be arranged and held in a range of various angles.

Referring further to FIG. 1, an advantage of the side positioning of the cutting wheel extension arm 120 is that the equipment operator may simply step over the frame 110 and over the hydraulic cylinder 128 to gain forward access to the operator's seat of the skid steer loader. The side mounting of the extension arm 120 also allows an operator seated in the operator's seat of the skid steer loader to view the side of the cutting assembly 150 while it cuts either horizontally or vertically. The side positioning of the extension arm 120 is further advantageous because rocks and wood chips thrown rearward by the rotating motion of the cutting wheel 30 are directed to the side of the equipment operator rather than directly toward the equipment operator.

A further advantage of the side positioning of the extension arm 120 is increased maneuverability. For example, the skid steer loader 10 may be driven parallel to a building or to a fence with the both side wheels adjacent to the building or fence. With the skid steer loader in such a position, the extension arm may extend parallel to the building or fence, and adjacent thereto for cutting and removing a tree stump located next to the building or fence.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A cutting system, comprising:
   a. a cutting assembly with an hydraulically powered, rotating cutting wheel wherein said cutting assembly is mountable to a frame;
   b. wherein said cutting assembly is arrangable in a first configuration for said cutting wheel to engage in substantially vertical cutting;
   c. wherein said cutting assembly is arrangable in a second configuration for said cutting wheel to engage in substantially horizontal cutting; and,
   d. an hydraulically powered pivot joint connected between said cutting assembly and the frame, and operable to rotate said cutting assembly in a range between said first configuration and said second configuration;
   e. wherein said cutting assembly is mounted on an extension arm mounted to the frame, wherein said extension arm is operably mounted to a first pivot to allow the positioning of said extension arm with said cutting wheel to be vertically adjustable relative to the frame and said extension arm is operably mounted to a second pivot to allow the positioning of said extension arm with said cutting wheel to be horizontally adjustable relative to the frame.

2. The cutting system of claim 1, wherein said cutting wheel comprises a plurality of cutting teeth.

3. The cutting system of claim 1, wherein said pivot joint is lockable to secure said cutting wheel in a selected one of said first configuration and said second configuration.

4. The system of claim 1, wherein said extension arm is configured to telescope in a direction extending away from or retracting towards the frame.

5. The system of claim 1, comprising a support vehicle having an hydraulic power supply, wherein said hydraulic power supply is operably connected to supply hydraulic power to said cutting wheel.

6. The system of claim 5, comprising a protective shield connected to the frame, wherein said protective shield extends outward from the frame and over said extension arm.

7. The system of claim 5, wherein said support vehicle is a skid steer loader.

8. The system of claim 5, wherein the frame is mounted to said support vehicle.

9. The system of claim 5, comprising a control station for controlling said cutting wheel, wherein said control station is in said support vehicle and wherein said control station is laterally offset from said extension arm.

10. A combination, comprising:
 a. a skid steer loader with an hydraulic power supply;
 b. a cutting system operably mounted to said skid-steer loader;
 c. wherein said cutting system includes a cutting wheel hydraulically powered by said hydraulic power supply;
 d. wherein said cutting wheel is arrangable in a first configuration to be operable for substantially vertical cutting;
 e. wherein said cutting wheel is arrangable in a second configuration to be operable for substantially horizontal cutting; and,
 f. an extension arm mounted to said skid-steer loader and having a distal end extending from said skid-steer loader;
 g. wherein said cutting wheel is mounted on said extension arm, wherein said extension arm is mounted to said skid-steer loader via a first pivot to allow the position of the distal end of said extension arm to be vertically adjustable and wherein said extension arm is mounted to said skid-steer loader via a second pivot to allow the position of the distal end of said extension arm to be horizontally adjustable to control the placement of said cutting wheel relative to said skid-steer loader.

11. The system of claim 10, wherein said extension arm contains a pivot joint operable to rotate said cutting wheel between said first configuration and said second configuration.

12. The system of claim 11, comprising a first hydraulic cylinder operably mounted to said extension arm and said skid-steer loader to vertically adjust the positioning of said extension arm, and a second hydraulic cylinder operably mounted to said extension arm and said skid-steer loader to horizontally adjust the positioning of said extension arm.

13. The system of claim 11, wherein said extension arm is arranged to telescope to extend and retract said cutting wheel.

14. The system of claim 11, comprising a control station in said skid-steer loader for controlling said cutting wheel, wherein said control station is laterally offset from said cutting member.

15. A cutting system, comprising:
 a. a frame mountable on a support vehicle;
 b. an extension arm mounted to said frame and having a distal end extending from said frame;
 c. an hydraulically powered rotating cutting assembly mounted to said extension arm adjacent said extension arm distal end;
 d. wherein said extension arm is vertically adjustable and wherein said extension arm is horizontally adjustable to control the placement of said cutting assembly relative to said frame;
 e. a first hydraulic cylinder operably mounted to said frame and said extension arm to vertically adjust said extension arm, and a second hydraulic cylinder operably mounted to said frame and said extension arm to horizontally adjust said extension arm; and,
 f. a pivot mechanism associated with said extension arm to rotate said hydraulically powered cutting assembly in a range between a substantially vertically cutting position and a substantially horizontal cutting position.

16. The system of claim 15, comprising hydraulic power supply lines extending from said frame to said cutting assembly, wherein said hydraulic power supply lines are connected to said cutting assembly above a cutting portion of said cutting assembly when said cutting assembly is in a substantially horizontal cutting position.

* * * * *